May 13, 1930.  C. N. HEATH  1,758,662
SILO
Filed June 17, 1927  2 Sheets-Sheet 1
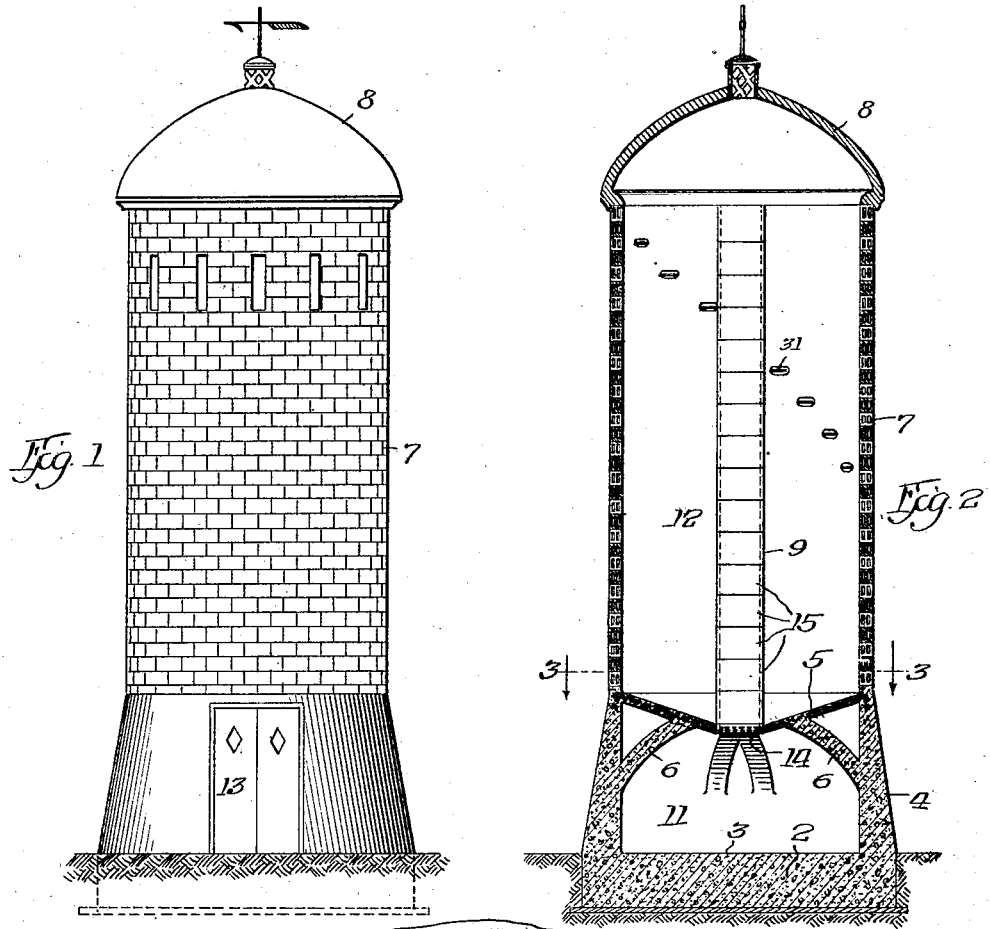
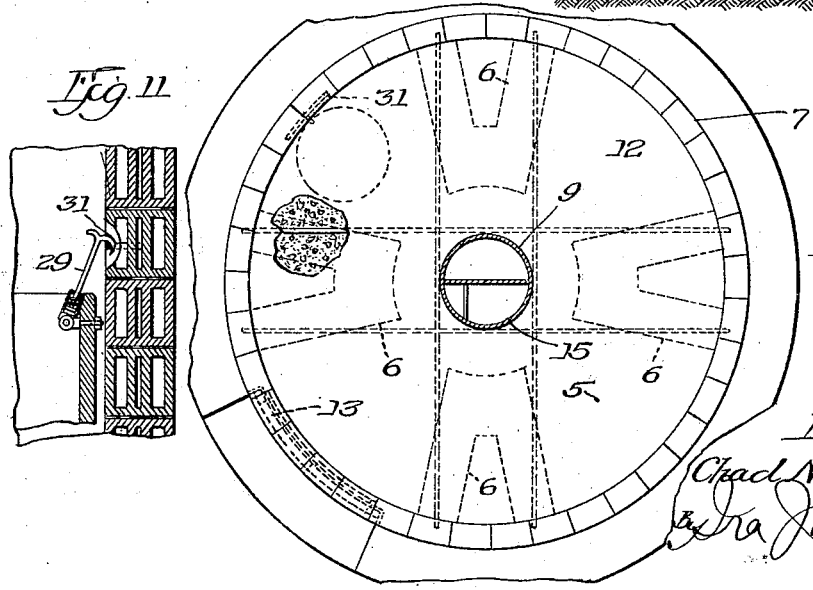
Inventor
Chad N. Heath
Ezra Wilson
Atty

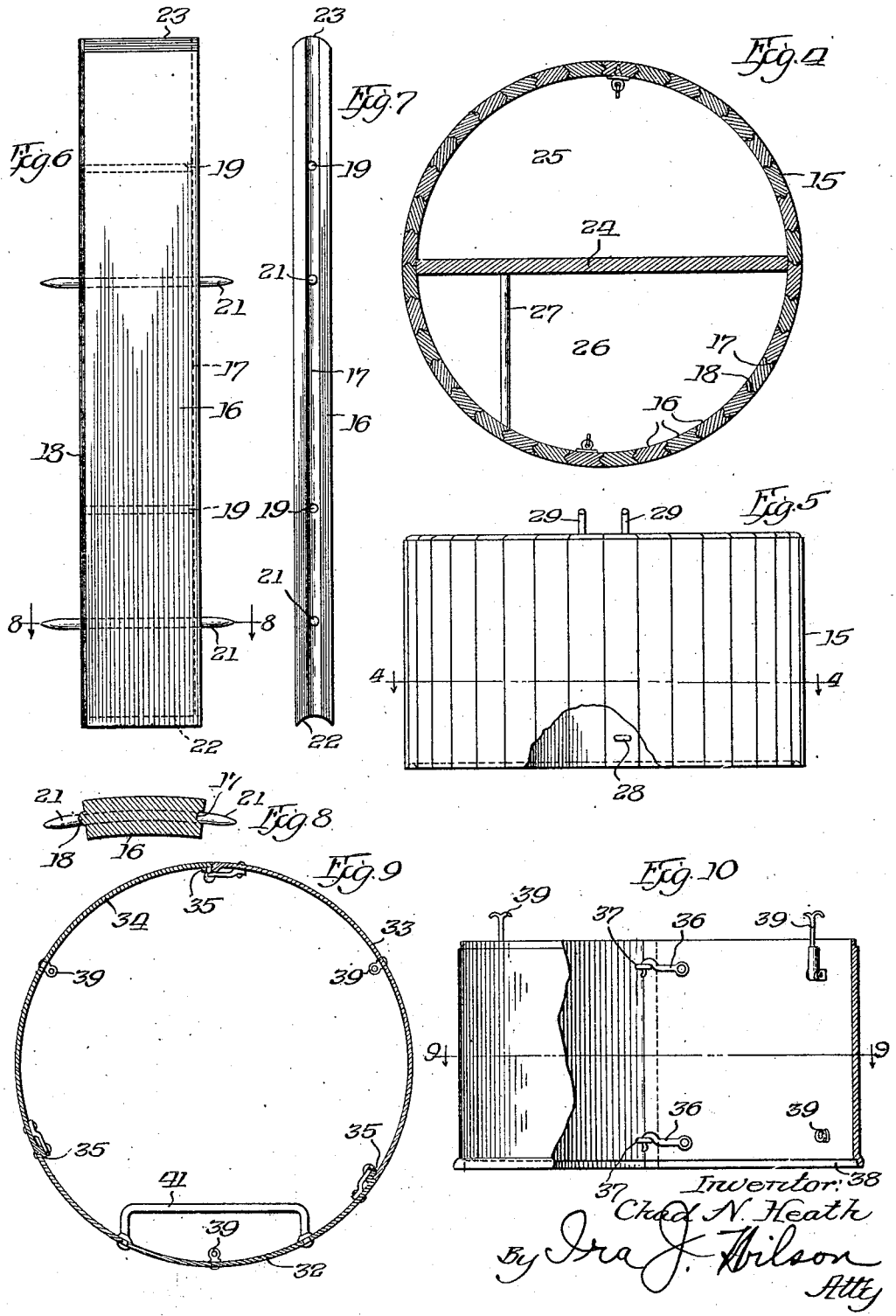

Patented May 13, 1930

1,758,662

UNITED STATES PATENT OFFICE

CHAD N. HEATH, OF TACOMA, WASHINGTON

SILO

Application filed June 17, 1927. Serial No. 199,435.

This invention pertains to silo construction and more particularly to an improved type of construction whereby the silage may be more efficiently and effectively stored, preserved and removed than has heretofore been possible.

Silos, as is well known, must be of substantially air tight construction in order that the silage may be preserved from mold and rot. They should also be of as simple construction as possible for obvious reasons. Heretofore silos have either been constructed with a chute outside of the exterior wall down which the silage may be thrown, or with a series of openings through the walls at different heights to permit the silage to be tossed out. With the first type of silo construction it is necessary to provide an expensive and unsatisfactory wall construction for the chute with openings thereto at different levels and it often happens that air spaces or crevices are left between the silage and the wall adjacent the chute which permit air to reach the silage and mold or rot it. The several openings to the silo through its wall also permit air to reach the silage and mold or rot it and this objection also follows from the second type of construction mentioned.

With my invention I provide a silo which is quickly and easily accessible for removal or storage of silage, a construction wherein there is no necessity for apertures or openings through the walls for removal or storage of the silage thereby permitting the walls to be of a continuous bond to make and maintain the silo air tight and jug-like, a construction in which there is no external chute to break the bond or the continuity of the silo wall and increase the cost of construction, and a construction in which the danger from mold or rot due to crevices or air pockets within the silage stored in the silo is minimized.

Accordingly one of the primary objects of my invention is to provide a novel type of silo construction in which the walls may be solid or imperforate throughout the height and circumference of the silage chamber. In this connection the silage chute is located centrally within the silo, preferably extends vertically upward therethrough, and is provided with a ladder or the like whereby a person may climb up and down the same to the top level of the silage within the silo.

Another object is to provide a novel type of silage chute composed of a number of co-operative detachable units adapted to be connected together or detached from one another one or more at a time as the silage is stored within the silo or removed therefrom.

A further object of the invention is to provide an arrangement whereby the chute sections may be stored in a safe, convenient and accessible place as they are removed from one another as the silage is used until again needed.

A still further object is to provide a silo having a feed room or the like in the base thereof into which the silage may be delivered from the chute and into which any convenient vehicle or piece of apparatus may be run or introduced for receiving the silage delivered down the chute.

Many further objects including the details of construction and the arrangements of the parts, as well as the advantages and mode of operation, will be or should become understood and appreciated after reading the following description and claims and after viewing the drawing in which:

Fig. 1 is an external elevation of one type of silo constructed in accordance with the invention, Fig. 2 is a sectional elevation of the same, Fig. 3 is a section taken on the line 3—3 of Fig. 2, Fig. 4 is a top plan view of a wooden chute section, Fig. 5 is an elevational view of the same, Figs. 6, 7 and 8 are details of construction of the wooden chute sections showns in Figs. 4 and 5, Figs. 9 and 10 are top plan and side elevations partly in section of a metal chute section, and Fig. 11 is a fragmentary detail of a portion of the silo wall and a portion of chute section on an enlarged scale showing one manner in which the chute section is adapted to be detachably hung to the wall of the silo when not in use.

In a preferred form of the invention a concrete base 2 provides a floor 3 and from the base a buttressed foundation 4 rises preferably to a height sufficient to afford a substantially lateral as well as vertical support for a reinforced concrete slab 5, a plurality of reinforced concrete supporting members 6 and the superstructure comprising the silo proper including preferably a cylindrical wall 7, roof 8 and the several sections of the chute, generally designated 9. The walls 7 are preferably constructed of hollow tile after the manner disclosed in Patent No. 1,511,467, dated October 14, 1924, although I have illustrated the foundation supporting structure for the silo more or less diagrammatically because the details thereof are not of the essence of the invention and because in the present day of concrete and reinforced concrete construction many types of construction suitable for my purpose may be utilized. This will be apparent to the reader.

The slab 5 provides a lower chamber 11 which may serve the purpose of a feed room and an upper chamber 12 within which the silage is stored. The lower chamber 11 is preferably of sufficient height to permit a man to work therein and a cart or other vehicle to be moved therein for reception of silage thrown down the chute which, as will be noted, is disposed substantially centrally of the silo. Access to and from the chamber 11 is had through a doorway 13 of any suitable design.

The slab 5 preferably slopes inwardly toward its center from all sides and terminates in an opening 14 from which the chute extends upwardly. This slab is preferably made of reinforced concrete and for silos of large diameter, it is desirable to brace it by reinforced concrete members 6 which may be arranged as shown in side elevation and top plan in Figs. 2 and 3 respectively, although as above noted, other types of construction may be used.

The chute 9 is composed of a plurality of interfitting sections 15 which are suitably connected together and when connected rise vertically upward through the center of the chamber 12 of the silo. In Figs. 4 to 8 inclusive is shown a chute section of wood construction comprising staves 16, each of which is provided with a mortice 17 and a tenon 18 and drilled, as shown at 19, for the reception of dowel pins 21. The dowel pins are located in alternate openings 19 in adjacent staves, as will be understood, and when the structure is assembled the staves will be securely interlocked together. If desired shellac or some other water-proof cement may be used to aid in securing the staves together and while each section may be banded I prefer not to do this, since bands form projections which are apt to catch the silage and form air pockets.

In order that the chute sections may fit on top of one another the lower ends of all chute sections are channelled out circumferentially, as shown at 22, and rounded off at their upper ends circumferentially of the section, as shown at 23. Thus when one section is set on top of another in its correct position it will seat thereon with its sides flush with the sides of the lower section. Each chute section is preferably divided diametrically throughout its height by a partition 24, which may be of wood or metal, whichever is preferable. These partitions may be secured to the walls of the chute section in any desirable manner, as will be understood, and serve to divide the chute section into a silage chute portion 25 and a ladder chute portion 26. Depending on the height of the sections each is equipped with one or more ladder rungs 27 in the ladder portion 26 so that when the chute sections are assembled a person may climb up and down the chute and thereby gain access to the silage chamber 12.

Before silage is placed in the chamber 12 the first one or two chute sections are put in place and the silage is packed therearound in the usual manner. As the silage is filled in and the height of filling increases additional chute sections are put in place until the silo is filled. While the silage tightly packed around the chute sections tends to hold them in place, I have found it advisable to latch the sections together and against accidental displacement. For this purpose latch eyes 28 are secured on opposite sides of the interior wall of each section adjacent its lower edge and corresponding spring latch members 29 similar to automobile hood latch constructions are secured to the opposite sides of the interior wall of each section adjacent its top edge. When the sections are put in place upon one another the latches 29 are engaged with the latch eyes 28 and the sections are prevented from being accidentally displaced from one another.

The latches 29 are also so placed with respect to the top edges of the sections and are so designed that they may serve the additional function of securing the sections to the interior side wall of the silo as the sections are removed from one another as the silage is used. In the interior wall of the silo U-shaped members 31 are imbedded in staggered or spiralled relation and at such distances above and below one another as will correspond with the height of a chute section. As the silage is removed from the top and the bottom of a chute section is uncovered the exposed chute section thus freed is disconnected from its adjacent chute section and by means of one of the latches 29 is hung from the interior wall of the silo on a U-shaped member 31. As the silage is removed succeeding chute sections are removed until the bottom is reached, each of the sections being hung on the wall of the silo ready to be taken down and put into place when the silo is again being filled.

In Figs. 9 and 10 I have shown a metal chute section which may in some instances be preferable to a wooden chute section. Each of the metal sections is preferably made in three parts, 32, 33 and 34. The edge of each part at one side is flanged inwardly, as shown at 35, to provide a shoulder against which the unflanged side edge of the adjacent part abuts so as to provide external continuity of surface, while latch hooks and eyes 36 and 37 respectively, may be provided for securing the several parts together. The lower circumferential edge of the parts are flanged outwardly, as shown at 38, and adapted to seat over the circumferential top edge of the section below it. Latch members 39, one for each of the parts of each section, serve the same purposes as the latch members 29 previously described. This type of chute section is not provided with a partition, but each section is provided with one or more ladder rungs or cleats 41.

When the silo is being filled with silage the first one or two chute sections are disconnected from the wall of the silo and put in place, and as the silage increases in depth additional chute sections are put in place until the silo is filled. Access to the top of the silo and to the top of the silage is provided by the ladder rungs in the chute sections so that a person may climb up and down the chute with ease. With the partitioned chute sections the silage is thrown down one side while ingress and egress to the top of the silo are had through the other side of the section and there is little danger of the persons slipping on the rungs of the ladder because of slippery silage caught thereon. The chute sections are removed one at a time and hung on the wall as the silage is removed, which places them out of the way in a readily accessible position for use when the silo is again to be filled. Silage thrown down the chute falls into the feed room or chamber 11 and may be caught in any suitable receptacle or vehicle placed therein for that purpose.

While I have shown and described what is at present a preferred form of the invention, it will be appreciated that it is susceptible of wide modification and variation without departing from its spirit or from the scope of the appended claims.

I claim:

1. In a silo, a silage chute comprising a plurality of individual sections superimposed one upon another rising substantially centrally of the silo, and means within certain of said sections whereby a person may climb up and down the chute, said sections receiving lateral support only from one another and silage about them.

2. In a silo, a silage chute rising substantially centrally of the silo and comprising a plurality of superimposed chute sections adapted to be individually removed one from another, and means within certain of said sections whereby a person may climb up and down the chute, said sections receiving lateral support only from one another and silage about them.

3. In a silo, a silage chute disposed substantially centrally thereof and composed of a plurality of individually removable sections superimposed upon one another, said sections receiving lateral support only from one another and silage about them, means within certain of said sections whereby a person may climb up and down the chute, and means for interlockingly securing the sections together.

4. In a silo, a silage chute disposed substantially centrally of the silo and composed of a plurality of chute sections adapted to be connected together in superimposed relation, means for detachably connecting said sections together, and means within and secured to certain of said sections whereby a person may climb up and down the chute, said sections receiving lateral support only from one another and silage about them.

5. In a silo, a silage chute comprising a plurality of chute sections adapted to interengage one another in superimposed removable relation, and means secured to the interior surfaces of certain of said chute sections to provide hand and foot supports for a person to climb up and down the chute, said sections receiving lateral support only from one another and silage about them.

6. In a silo, a silage chute disposed substantially centrally thereof and composed of a plurality of individually substantially cylindrical removable sections superimposed upon one another, and means within certain of said sections whereby a person may climb up and down the chute, said sections receiving lateral support only from one another and silage about them.

7. In a silo, a silage chute disposed within said silo and free from the sides thereof and composed of a plurality of self-supporting and sustaining individually removable sections superimposed one upon another, said sections receiving lateral support only from one another and silage about them.

8. In a silo, a silage chute disposed within said silo and free from the sides thereof and composed of a plurality of self-supporting and sustaining chute sections adapted to be connected together in superimposed relation, and means for detachably connecting said sections together, said sections receiving lateral support only from one another and silage about them.

In witness of the foregoing I affix my signature.

CHAD N. HEATH.